Nov. 30, 1937.  H. A. KNOX  2,100,338
SUSPENSION FOR VEHICLES
Filed Feb. 15, 1937   2 Sheets-Sheet 1
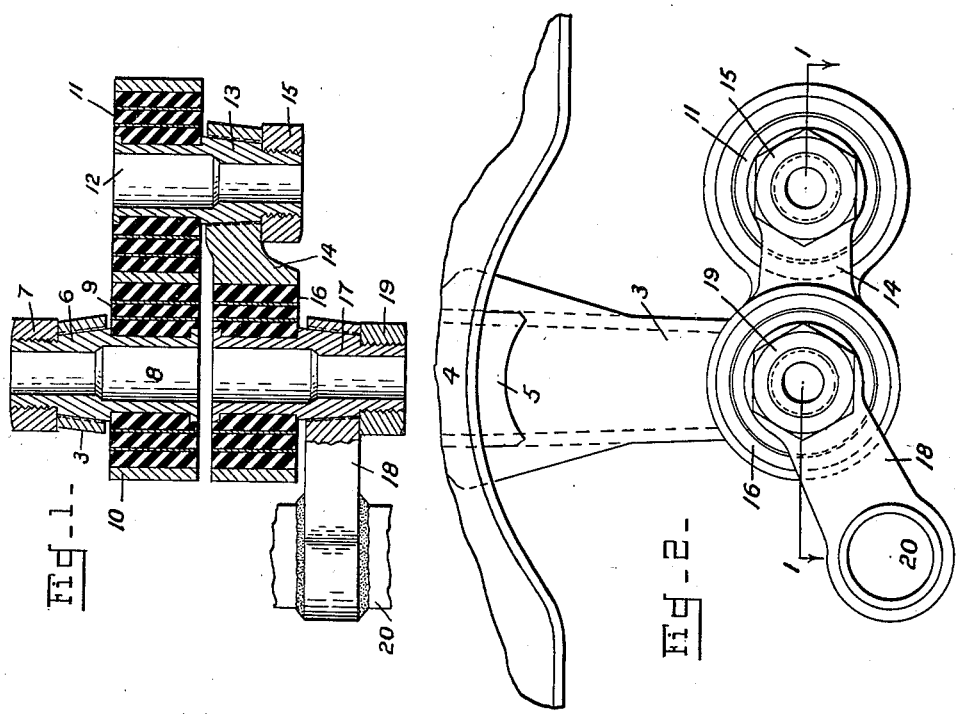
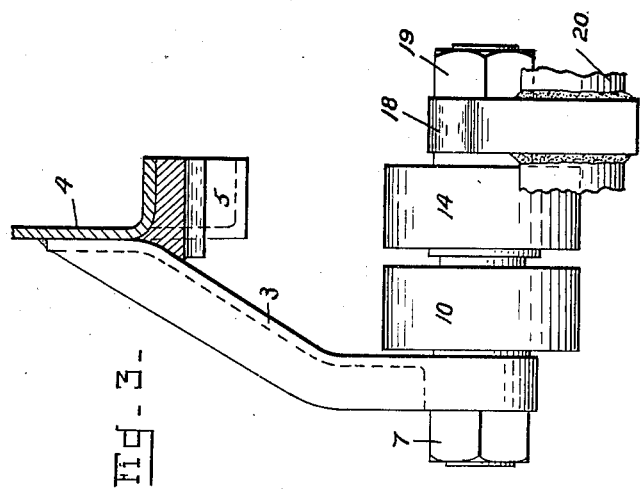
Inventor
Harry A. Knox
By W. N. Roach
Attorney Nov. 30, 1937.  H. A. KNOX  2,100,338
SUSPENSION FOR VEHICLES
Filed Feb. 15, 1937  2 Sheets-Sheet 2
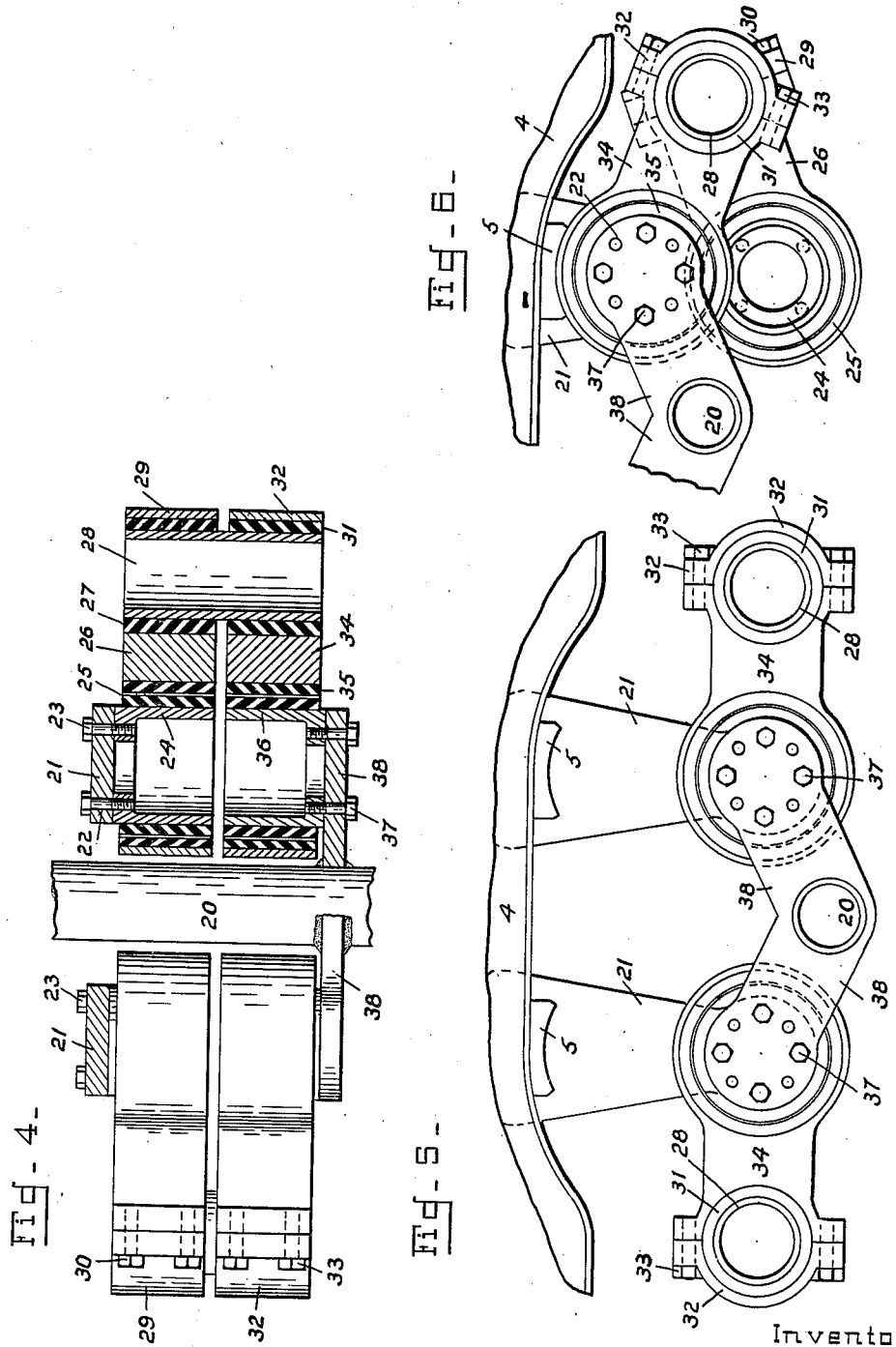
Inventor
Harry A. Knox
By W. N. Roach
Attorney Patented Nov. 30, 1937

2,100,338

UNITED STATES PATENT OFFICE 2,100,338

SUSPENSION FOR VEHICLES

Harry A. Knox, Washington, D. C.

Application February 15, 1937, Serial No. 125,791

7 Claims. (Cl. 267—21)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a suspension for vehicles and more particularly to that type of suspension in which torsional stresses are set up and resiliently resisted.

Main objects of the invention are the provision of a suspension which is simple and compact and one which requires little attention during its operative life; and further to provide a suspension which includes within itself a shock absorbing element.

Practical embodiments of the invention are disclosed by way of illustration in the accompanying drawings, wherein:

Fig. 1 is a section on the line 1—1 of Fig. 2;

Fig. 2 is a side elevation showing the device attached to a vehicle a fragment of the frame of which is shown, the parts being in position of normal load;

Fig. 3 is a front elevation;

Fig. 4 is a sectional view similar to Fig. 1 showing another form of the device;

Fig. 5 is a side elevation showing the parts in position of normal load, and

Fig. 6 is a fragmentary side elevation, the parts in position of full load.

Referring to the drawings by numerals of reference:

There is provided a bracket 3 adapted for attachment to the load as represented by the frame 4 or other suitable part of a vehicle, and there may be formed on the upper part of the bracket a bumper 5 to limit downward movement of the frame. The lower end of the bracket 3 is apertured and the walls of the aperture are tapered and serrated to adjustably receive the tapered and serrated portion 6 of a pivot pin an end of which is threaded to receive a nut 7, which clamps the same in place on the bracket.

Encircling the extending portion 8 of the pivot pin is a resilient joint or bushing 9 (which with the other resilient joints or bushings herein described, represents any form of torque resisting resilient joint suitable for the purpose) housed in an opening in a link or lever arm 10. It will be understood that the resilient joint 9 does not turn on the pivot pin or within the link but permits motion of the link with respect to the pin merely through flexure of the material of the joint and the same is true of the other resilient joints herein described.

The link 10 adjacent its other end is apertured to receive a resilient joint 11 which encircles a pivot pin 12 formed with a tapered portion 13 which is serrated and engages a tapered and serrated aperture in one end of a link 14 to which it is bound by a nut 15 threaded on one end of the pin.

The link 14 is apertured adjacent its other end to receive a resilient joint or bushing 16 which encircles a pivot pin an extending portion 17 of which is tapered and serrated to engage a tapered and serrated aperture formed adjacent to one end of an arm 18 to which it is secured by a nut 19 threaded on the end of the pin.

The link 18 has its other end secured in any suitable manner to the load supporting element such as the axle housing 20.

As will be understood, the joints or bushings 9 and 16 are assembled under sufficient torque to bring the parts into the position shown in Fig. 2, when under normal load, while the joint or bushing 11 is not under flexure while the load is normal.

In the form shown in Figs. 4, 5 and 6 there is provided a bracket 21, two being herein shown, adapted to be secured to the load as represented by the frame 4 or other suitable part of the vehicle and there may be formed on the upper part of the bracket a bumper 5 to limit downward movement of the load. The lower end of the bracket 21 is provided with annularly spaced apertures 22 for the reception of machine bolts 23 which bind in place thereon a pivot member 24.

Encircling the pivot member 24 is a torsion resisting resilient member of any construction suitable for the purpose, such members being herein illustrated as a compound resilient bushing 25. The bushing 25 under proper compression is housed in an aperture formed in one end of a link or lever arm 26, the other or free end of which is formed to receive the resilient bushing 27, which is forced on a pin 28 of greater exterior diameter than the normal interior diameter of the bushing, and a cap 29 which, when seated by the bolts 30, places the bushing under suitable compression.

The pin 28 extends laterally in one direction beyond the link 26 and is encircled by a bushing 31, similar in all respects to the bushing 27, which bushing is placed under compression by a cap 32 secured by bolts 33 to a link 34, which is apertured adjacent to its other end to receive a resilient bushing 35, similar to the bushing 25, which encircles a pin 36. Secured to the pin 36 as by the bolts 37 is an arm 38, the free end of which is secured in any suitable manner to the axle housing 20.

It will be understood that while only one bracket with its connected lever arms or links has been described the other bracket with its connected lever arms or links is a duplicate of that described and is used only when an extreme load demands such duplication.

The operation is as follows: the resilient joints or bushings 9, 16, 25 and 35 are assembled so that under normal load the links have been moved about the pivot pins until the torque or the joint is sufficient to counterbalance the normal load with the links in the positions shown in Figs. 2 and 4.

When excess load is applied the load and brackets 3 and 21 move downwardly carrying with them the pivot pins and causing a further flexure of the bushings 9, 16, 25 and 35 and a consequent flexure of the joints or bushings 11, 27 and 31. From this it is evident that while the bushings 9 and 16 partake of angular deflections due to the change of position of their respective links 10 and 14, the bushing 11 partakes of a deflection due to the change of position of both links or is deflected through twice the angle of either of the other bushings, which action will impart to said bushing the character of a shock absorbing member as well as a suspending member. It will also be evident that the bushings 27 and 31 will each partake of a flexure equal to the additional flexure given to each of the bushings 25 and 35 under fluctuations in load, and further that these bushings will under equal angles of flexure give greater resistance to turning than the bushings 25 and 35 under like flexure.

I claim:—

1. A suspension for vehicles embodying torque resisting elements, one of said elements connected to the load carrying member, another of said elements connected to the load, the third of said elements intermediate the first two elements to have an angular movement equal to the sum of the movements of the other two elements and connecting members from the third element to each of the other two elements.

2. A suspension for vehicles embodying torque resisting elements, one of said elements connected to a load carrying member, another of said elements connected to a load, both the before mentioned elements under angular deflection when subjected to the stress of a normal load, and a third torque resisting element interposed between the before mentioned elements, said element unflexed under normal load.

3. A suspension for vehicles embodying an arm, a torque resisting element through which the arm is connected to a load carrying member, a second arm, a torque resisting element through which the second arm is connected to a load, the torque resisting elements under torque in opposite directions, and a pivotal connection for the arms including a torque resisting element normally unflexed.

4. A suspension for vehicles embodying an arm, a torque resisting element through which the arm is connected to a load carrying member, a second arm, a torque resisting element through which the second arm is connected to a load, the said elements normally under load resisting torque, and a pivotal connection for the arms including a torque resisting element normally unflexed.

5. A suspension for vehicles embodying an arm, a torque resisting joint through which one end of said arm is connected to a load carrying member, a second arm, a torque resisting joint through which one end of the second arm is connected to a load, and a pivotal connection for the other ends of the arms including a torque resisting element, whereby the axes of the joints move in a plane substantially perpendicular to the load.

6. A suspension for vehicles embodying an arm, a torque resisting joint at one end of said arm for attachment to a load carrying member, a second arm, a torque resisting joint at one end of said arm for attachment to a load, each of said joints under load resisting flexure and a pivotal connection between the other ends of said arms including a torque resisting joint.

7. A load suspension embodying two movable arms and three torque resisting joints, one of said arms to be attached to a load carrying member through one joint, another of said arms to be attached to the load through a second of the joints, and the two arms connected by the third joint whereby the load is transmitted through the arms and joints in series and under normal load two of the joints will support the load by their torque resistance with no torque on the third joint and under maximum load all the joints support the load by their torque resistance.

HARRY A. KNOX.